Jan. 22, 1963  F. N. ZIMMERMANN  3,074,349
PORTABLE ELECTRIC IMMERSION LIQUID PUMP
Filed Sept. 21, 1961  2 Sheets-Sheet 1
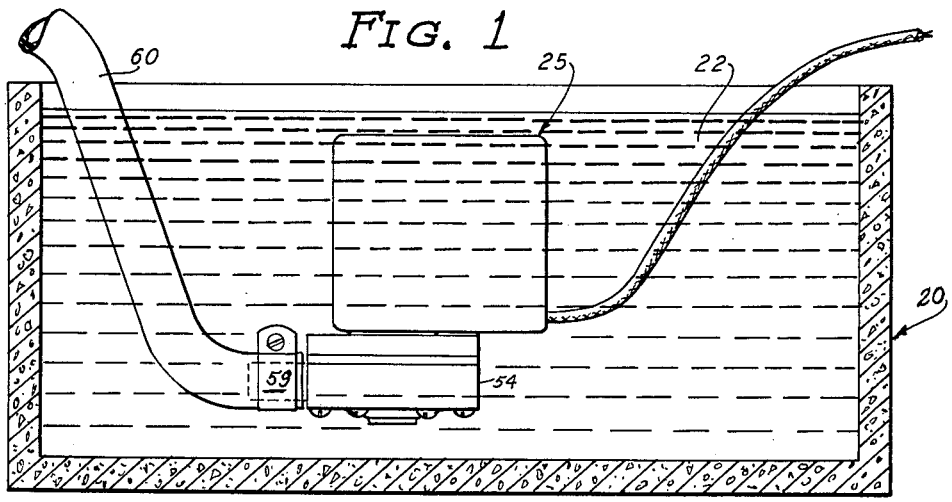
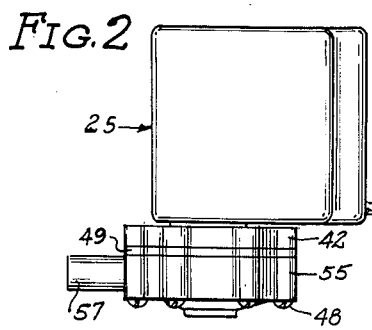
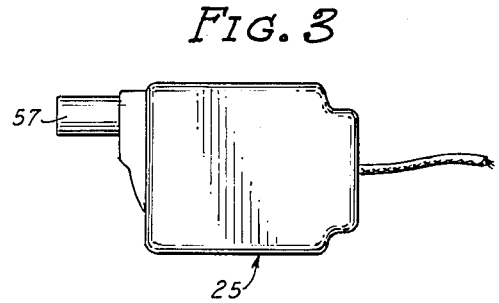
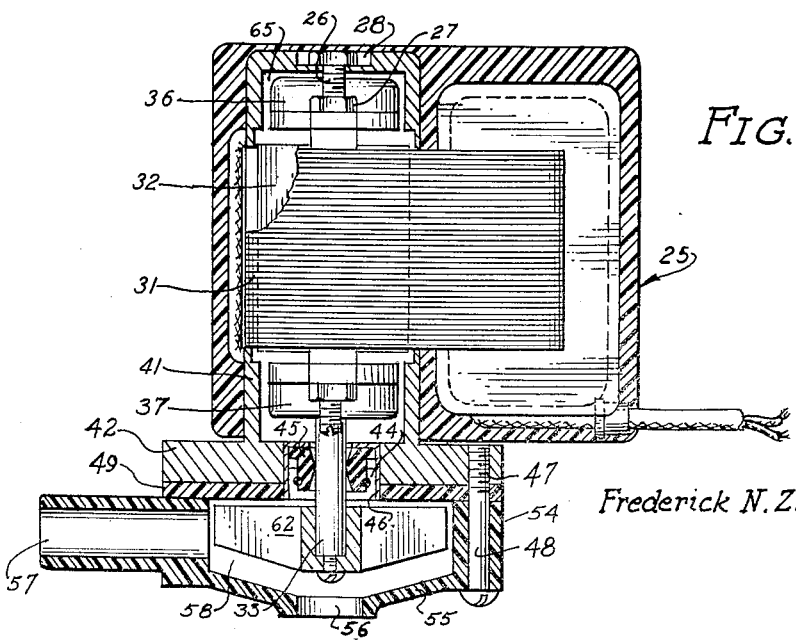
INVENTOR.
Frederick N. Zimmermann

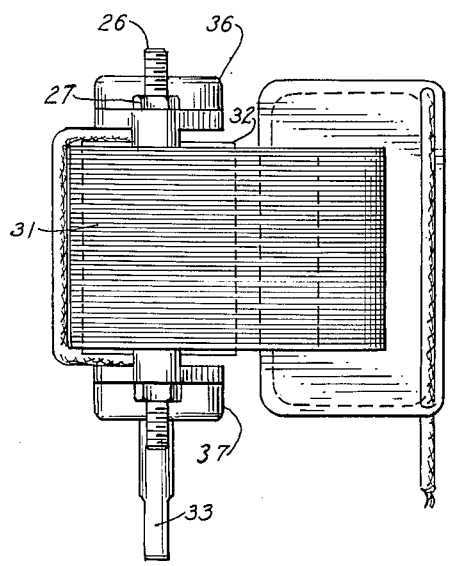
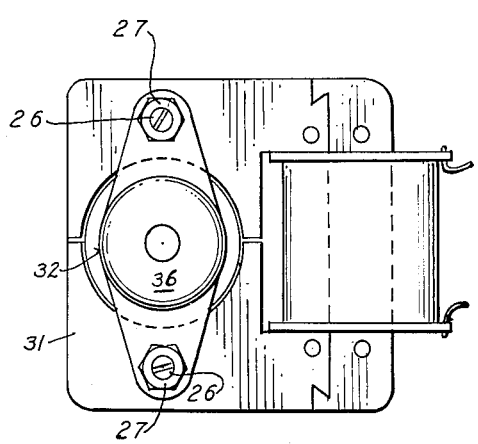
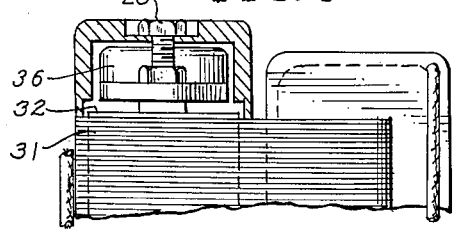
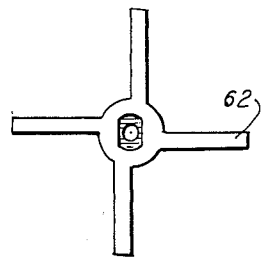
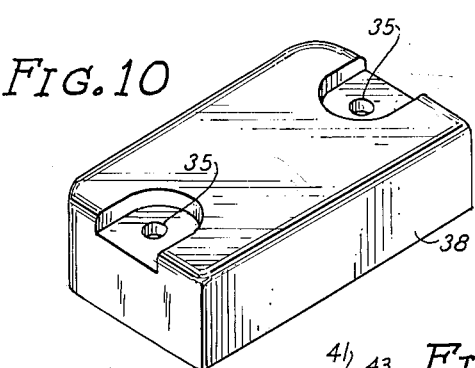
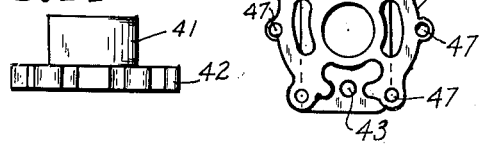
INVENTOR.
Frederick N. Zimmermann

United States Patent Office 3,074,349
Patented Jan. 22, 1963

---

3,074,349
PORTABLE ELECTRIC IMMERSION LIQUID PUMP
Frederick N. Zimmermann, Bannockburn, Ill., assignor to March Manufacturing Co., Skokie, Ill., a corporation of Illinois
Filed Sept. 21, 1961, Ser. No. 140,651
4 Claims. (Cl. 103—87)

This invention relates to electric, immersion, liquid pumps, and in particular to an improved construction of liquid-tight resin sheathed portable electric immersion pumps.

Submersible electric liquid pumps usually are partially exposed to the liquid being pumped and therefore protection of the pumps, and in particular the electrical connections to the pump from the moisture and corrosive effects of such liquids presents a serious problem in the maintenance of such pumps, said undesirable effects causing the pumps to operate at unusually high temperatures.

The object of this invention is to provide an electric, liquid pump wherein the stator, the coil, and the armature of the pump motor is completely encapsulated in resin, and which has novel means to transfer the heat generated within the motor to the outer surface, thus adapting it to situations where the surrounding liquid being thereby pumped changes its level, at one time covering the motor and later leaving the motor surrounded by hot air, or to situations where a high percentage of overload must be handled.

Another object of this invention is to provide means which can be applied in liquid form to encapsulate the pump motor and which will guard the outer heated surfaces of the motor and assist in the dissipation of heat.

A further object of this invention is to provide a pump with an electric motor, having assembled therewith a pair of end caps, or bearing cap shields for preventing the fluid being pumped from seeping into a compartment formed around the motor rotor and motor bearings and suitable to enclose and seal oil within said compartment; one of said caps having an integral flange therewith for attaching the pump housing thereto.

Earlier inventions embodying pump assemblies adapted to be submerged in water, each having their stator and stator coils arranged within an oil coolant filled sealed chamber where the oil was the sole means to transmit the heat developed by the pump while in use to a pump shell, the shell being of highly heat conductive material in direct contact with the liquid in which the pump unit is immersed and cooled thereby. However, when all of the liquid has been pumped out from around the pump, and the pump allowed to continue running, the shell became very hot, the oil became very hot and stayed hot, and soon the pump was damaged due to excessive heat. The present invention does not embody a shell as stated above and eliminates this undesirable excessive heat trouble.

Another object of this invention is to provide a submersible electric pumping unit in which the motor rotor and motor bearings are contained within an oil coolant filled chamber formed with the use of a pair of end caps, or bearing cap shields, said caps and the stator coils being encapsulated with sealant material which is cast and which solidifies at normal room temperature, or suitable low temperatures, thereby providing a liquid proof junction so that the entire pumping unit may be immersed directly into a liquid to be pumped without causing any damage to the unit from moisture or liquid when immersed, or from lack of cooling air when operated outside of total immersion.

A further object of the invention is to provide a waterproof coating to the stator coils, and the electrical leads to the driving motor, and to portions of metal end caps arranged about the motor bearings of the pump assembly, the coating providing heat dissipating means to cool the motor during full load operation for long periods of time without injury or loss of efficiency due to deleterious increase in temperature, the coating providing "breathe-in" means whereby the motor is completely sealed against moisture and the like; the coating actually increasing the heat radiating area of the unit.

A still further object of the invention is to provide for the rapid and secure assembly of the motor and pump parts and rapid and efficient closing and sealing of the parts from which liquid to be pumped is to be excluded.

Another object of the invention is to provide a method of making and assembling a pump for carrying out some or all of the preceding objects, and more particularly to provide a method of centering, locating and aligning the motor and impeller parts of a pump with respect to coacting parts and instrumentalities and the method of encapsulating the stator coils with epoxy resin, whereby it is completely sealed against liquid, moisture and the like.

Other objects include providing method and means for making an efficient, compact, longlived, rugged water pump economically and effectively.

Other objects and a fuller understanding of the invention may be had by referring to the following description taken in conjunction with the accompanying drawings in which:

FIGURE 1 is a fragmentary view in side elevation of the pumping unit of this invention, illustrating the unit in operative relation in a reservoir, or other container, shown in cross-section, from which liquid is to be pumped and in which the unit is immersed;

FIGURE 2 is a side elevational view of the pumping unit with the motor totally encapsulated by resin sealant material;

FIGURE 3 is a top plan view of the pumping unit illustrated in FIGURE 2;

FIGURE 4 is an enlarged vertical central sectional view of the pumping unit illustrated in FIGURE 2, showing the preferred embodiment of the invention;

FIGURE 5 is a fragmentary view in side elevation illustrating the motor and its stator coils assembled together, the bearing cap shields being removed, and prior to being encapsulated by the sheathing material;

FIGURE 6 is a top plan view of the motor and its stator coils assembled together as illustrated by FIGURE 5;

FIGURE 7 is a fragmentary view in side elevation of the motor unit shown by FIG. 5, having a bearing cap shield assembled over the top bearing and shown in cross-section;

FIGURE 8 is a top plan view of the "Zytel Nylon" impeller shown by FIGURE 4 within the pump housing;

FIGURE 9 is a side elevational view of the impeller shown by FIGURE 8;

FIGURE 10 is a perspective view of the end cap assembled over the top bearing of the motor, when arranged vertically, the cap being assembled in liquid tight engagement with the upper surface of the motor laminations;

FIGURE 11 is a reduced size, side elevation of the end cap assembled over the bottom bearing of the motor, when arranged vertically as shown in FIG. 4; and FIGURE 12 is a reduced size, bottom plan view of the end cap illustrated by FIG. 11.

The present liquid pump is adapted for use in a very humid atmosphere, and, more or less submerged completely in water. As best shown in FIGS. 3 and 6, the present pump is substantially rectangular in top plan form. However, it is to be understood that the pump may take any other suitable shape as required by its specific application.

Referring now to the drawings of the pump assembly and in accordance with my invention, the reference numeral 20 designates a suitable conventionally illustrated reservoir, fountain or the like, in which a quantity of liquid 22 is contained, said liquid to be pumped by the pumping unit which is generally indicated by the reference numeral 25.

Referring to FIGS. 4 and 5, wherein details of the construction are illustrated, the pump unit 25 consists of a motor 31 having a rotor 32 rotatable on a vertical axis and driving a shaft 33. It will be noted that the motor 31 has the field 34 mounted to one side of the rotor 32. The motor 31 is provided with a pair of plate locking bolts 26, an upper bearing cap 36 and a lower bearing cap 37, said caps mounted over said bolts 26 and secured therewith by nuts 27; also a motor hollow upper bearing cap shield 38, with depending side and end walls and its lower end open, having a pair of holes 35 in its top end wall, and placed over the upper ends of said bolts 26 and secured thereto by a pair of nuts 28. A motor hollow lower bearing cap shield 41 having upwardly extending side and end walls and a flanged bottom extension 42, having a pair of holes 43 in the bottom end wall thereof placed over the lower ends of bolts 26 and secured thereto by a pair of nuts, similar to nuts 28. Said upper bearing cap shield and said lower bearing cap shield when assembled over said bolts 26 and secured thereto, completely seal and form a chamber over and around said bearing caps 36 and 37. The lower bearing cap shield 41 is provided with a counter bore forming a grommet cavity 44 to retain a grommet 45, or shaft seal therein, the grommet having a venturi-shaped bore therein to receive the shaft 33 therein, the grommet 45 being made of seal-forming resilient material and enclosed within a metal shell 46 which fits tightly within counter bore, or cavity 44. The lower bearing cap shield 41, as well as bearing cap shield 38, being made of metal. The bearing cap shield 41 has a horizontal metal flange portion 42 with a plurality of protuberant parts vertically arranged about its peripheral edge portion having interior threaded bores 47 to receive threaded bolts 48 therein. A nylon type base plate 49, having a peripheral configuration similar to said flange portion 42, with holes aligned with bores 47, is assembled below said flange 42 and in contact therewith.

A pump housing 54 is constructed from a suitable material, such as nylon. Said housing 54 embodies a base portion 55 with a central liquid inlet opening 56, side walls with an outlet 57, a circular pump chamber 58, said pump chamber being closed at its top by said base plate 49. The threaded bolts 48 extend upwardly through bores in the protuberant parts of the pump housing, through aligned openings in base plate 49 and threaded into the internal threaded bores 47 in flange 42 of lower end cap 41; the pump chamber 58 sometimes referred to as an impeller cavity. The bottom of the impeller cavity is of interior concave configuration, with the exterior being of convex configuration. Since the pump will operate in any position, the inlet opening 56 is always exposed to the liquid. The outlet 57 consists of a cylindrical extension extending horizontally, as shown by FIG. 4. A hose 60 is secured to the end of said outlet 57 and secured thereto by clamp 59.

The shaft 33 becomes the driving shaft for the impeller 62, consisting of four radial blades, secured to the lower end thereof and within said impeller cavity 58. The space surrounding the shaft 33, the rotor 32, and between the upper and lower motor bearing cap shields 38 and 41 and inside motor wall, will be considered the motor chamber 65. It is clearly seen that the pump rotor and the bearings are enclosed in an oil coolant poured into the motor chamber 65 simply by momentarily removing the grommet 45 and thereafter sealing it again in grommet cavity 44 and about shaft 33.

As shown by FIGURE 4, the motor 31 with field 34 and motor bearing cap shields 38 and 41 are assembled together as a motor unit. The motor unit is then substantially covered by an epoxy resin coating, as for example a coating similar to "Scotchast" resins produced by Minnesota Mining Co. Such an epoxy resin will cure without pressure of any kind during the curing process. After applying the coating, and/or dipping the motor into the coating material, and allowing the motor to be exposed to the air for a period of time, at room temperature, or relatively low temperatures much below 350 degrees, the resin becomes completely hardened and encapsulates the entire electric motor, including the motor coil, motor laminations, top bearing cap shield, the bottom bearing cap shield and the lead end wires. Due to the nature of the epoxy resin, it encapsulates the motor, leaving the flanged portion of the lower bearing cap shield free for assembly and securement of the base plate and pump housing with the motor, whereby the impeller will be driven by the free and exposed end of the shaft 33. The coating covers the non-insulated parts preventing moisture and liquid from contacting vital metal and moving parts, or entering any cavity thereof. No outside shell is needed as a form of protection or as a heat conductive medium. The thickness of the epoxy resin coating is clearly shown by FIG. 4. It is well known that the use of epoxy resins involves the mixing of two components, a resin and a hardener; no chemical action takes place until the two are mixed. Once the two components are mixed, the mixture is poured into a holder, or container, and the motor unit is coated by dipping it into the mixture, or the mixture is sprayed or poured thereon and the coating type hardens without the addition of heat. The sealant forms a water-tight bond with the entire exterior of the motor and the lead wire associated therewith.

The electric motor embodying an armature, a stator, of magnetic material, a motor coil, bearings, bearing caps and associated parts, with novel motor bearing cap shields over the bearings, being so constructed and assembled to leave only a flange portion extending from the lower bearing cap shield to which the pump housing is attached, the motor is encapsulated with resin before the housing is attached, providing a waterproof pumping unit.

The necessity of such a totally insulated motor unit for use in liquids or where used in moist atmospheres, is well known. Because it was difficult to provide a completely waterproof electric pump, many previous pumps were forced to be completely enclosed in oil, the oil absorbing the heat from the pump and motor parts, and the outer shell being of highly heat conductive material conveyed the heat to the water in which it is submerged. However, when the water level becomes low, or the reservoir becomes dry of water to be pumped, the shell stays hot and cannot cool the oil; whereby the running or moving parts become overheated, the gaskets become damaged by the heat and then when water, or a liquid, again returns to the reservoir to be pumped, the water leaks into the bearings or becomes mixed with the oil providing poor lubrication, resulting in complete ruination of the pump. My coated unit provides a completely sealed motor chamber with oil therein; the heat of the moving parts is conducted by the oil to the associated metal walls and parts, through the resin coating and to the liquid in which the pump is immersed. Should the water become pumped out, the air conducts the heat from the coated unit; and when water again returns to the reservoir, the coating will not allow any water to leak into the motor chamber past the gaskets and grommets about moving parts. It is well known that moving parts free of rust, or dirt, there is less friction and less heat produced. Therefore, if no moisture can come in contact with heated or worn grommets, due to a complete coating of the parts by a breathing type resin, my pump will run and excessive heat of the motor unit is never encountered.

In my invention, a portable immersion type electric pump is obtained and is free of elevated temperatures which effect parts, resulting in a damaged, worn-out pump unit. The epoxy resin, or other suitable materials such as "Scotchast" resin sealout, is cast and no pressure is required during the curing process; the resin becomes completely hardened and encapsulates the electrically-energized, non-insulated parts, in a waterproof, high temperature resistant, totally-insulated motor unit. This process lends itself to a low-cost, easily adaptable method of making a waterproof, motor unit suitable for use and assembly to form an electrically driven pump suitable to be immersed in the liquid being pumped. It is important to remember that this pump can be used with the pump housing at the bottom, or the unit can be turned in any position; the location of the pump housing need be only with the liquid inlet thereof under water during use by an operator.

Although I have described my invention with a certain degree of particularity, it is understood that the present disclosure has been made only by way of example, and that changes in details of construction and the combination and arrangement of parts may be resorted to without departing from the spirit and scope of the invention here presented.

What I claim is:

1. An electric actuated liquid pump assembly comprising an electric motor unit and a liquid pump housing rigidly secured together, said motor unit having a drive shaft, a rotor, a field of magnetic material, a coil mounted on said field, said rotor mounted on said drive shaft and rotatable therewith, an upper bearing cap mounted upon said field and supporting the upper end portion of said drive shaft, a lower bearing cap mounted upon the lower surface of said field and supporting the lower end portion of said drive shaft, an upper bearing cap shield enclosing said upper bearing cap and secured in intimate contact with the upper surface of said field, a lower bearing cap shield enclosing said lower bearing cap and secured in intimate contact with the lower surface of said field, a pump housing attached solely to said lower bearing cap shield, said pump housing embodying an impeller cavity, the lower end of said drive shaft extending into said impeller cavity and arranged to rotate therein, an impeller affixed to the lower end of said drive shaft within said impeller cavity and arranged to rotate with said drive shaft, said impeller cavity having a liquid inlet and a liquid outlet embodied therewith, and a layer of epoxy resin encapsulating said motor unit thereby coating the external surfaces of said field, said coil, and said bearing cap shields whereby said rotor and bearing caps remain in an uncoated condition and the said epoxy resin acts as a heat transfer medium for heat generated by said electric motor unit.

2. In a portable electrically actuated liquid pump assembly comprising, in combination, an epoxy resin sheathed motor unit and a removable unsheathed liquid pump housing, said motor unit embodying an impeller shaft, a rotor assembled upon said impeller shaft intermediate its ends, a field, a coil, an upper bearing cap mounted upon said field and supporting the upper end portion of said impeller shaft, a lower bearing cap mounted upon the lower surface of said field and supporting the lower end portion of said impeller shaft, an upper bearing cap shield enclosing said upper bearing and secured in intimate contact with said field, a lower bearing cap shield enclosing said lower bearing cap and secured in intimate contact with the lower surface of said field, said pump housing affixed solely to the lower bearing cap shield, said pump housing having an opening in the upper wall portion thereof, said pump housing embodying an impeller cavity therein, said impeller shaft extending through said opening in the upper wall portion of said housing, said impeller shaft actuated by said rotor and the lower end thereof extending into said impeller cavity, an impeller affixed to the lower end of said impeller shaft and rotatable therewith and within said impeller cavity, said impeller cavity having a liquid inlet and a liquid outlet embodied therewith, said electrc motor unit energized by a source of electric current from a flexible cord set attached thereto, and a layer of epoxy resin encapsulating said motor unit thereby the exterior surfaces of said field, said coil, said bearing cap shields and said ends of said flexible cord set are coated by said epoxy resin leaving said bearing caps and rotor in an uncoated condition, said improvement providing a water proof junction so that the entire liquid pump assembly can be immersed directly in a liquid without causing a potential danger to the motor unit and a potential shock to the user.

3. In a motor-driven pump adapted to be immersed in a body of water to be pumped, comprising an electric motor unit and a liquid pump housing rigidly assembled together, said motor unit having a rotor, a field of magnetic material, a coil mounted on said field, an impeller shaft extending vertically through said rotor and rigidly secured therewith and adapted to rotate therewith, an upper bearing cap, a lower bearing cap, said bearing caps supporting said impeller shaft, an upper bearing cap shield enclosing said upper bearing cap and secured in sealing contact with said field, a lower bearing cap shield enclosing said lower bearing cap and secured in sealing contact with said field, said lower bearing cap shield having upwardly extending side walls and a flanged bottom extension, said extension having a plurality of protruberant parts vertically arranged about its peripheral edge portion and having internally threaded vertical bores therein, a base plate having a peripheral configuration similar to said flanged bottom extension with vertical holes therein, said pump housing having an impeller cavity with an open top portion and a concave interior bottom wall, a liquid inlet, a liquid outlet, and protuberant parts with vertical bores therein, said base plate having a central opening and arranged between said lower bearing cap shield and said pump housing forming an upper closure wall for said impeller cavity, said threaded bores in said flanged bottom and said vertical holes in said base plate and said vertical bores in said protuberant parts of said pump housing being in vertical alignment with those above and below each other, bolt means extending through said vertical bores and holes in vertical alignment thereby securing said pump housing rigidly with said lower bearing cap shield, the lower end of said impeller shaft extending through said opening in said central base plate and into said impeller cavity, an impeller affixed to the lower end of said impeller shaft and rotatable therewith, said electric motor unit energized by a source of electrical current from a flexible cord set attached thereto, and a layer of epoxy resin encapsulating said unit whereby the exterior of said field, said coil and bearing cap shields are covered therewith so that the entire water pump can be immersed directly in a liquid without causing a potential danger to the electric motor unit and a potential shock to the user.

4. An electric liquid pump device, comprising an electric motor unit including a rotor, a field and a coil secured to said field, a pair of bearing caps supporting said rotor by means of an impeller shaft mounted within said rotor, an upper bearing cap shield, a lower bearing cap shield, said shields enclosing said bearing caps, and a separate pumping unit including a pump housing with an impeller cavity therein, a liquid inlet opening, a liquid outlet opening, a base plate covering said impeller cavity and having a central bore therein, said pump housing and base plate secured solely with the lower bearing cap shield, the said impeller shaft extending from said rotor and its lower free end thereof extending through said opening in said base plate and into said impeller cavity, an impeller mounted on the lower free end of said impeller shaft, a lead wire electrically connected to the coil and extending therefrom for connection to a source of electrical energy, said lower bearing cap shield provided with a central bore forming a grommet cavity, a metal shell tightly secured in said grommet cavity, a grommet arranged in said shell, said grommet having a venturi-shaped bore therein through which said impeller shaft extends, and a protective epoxy coating enveloping the entire outer surface of said field, said coil, said bearing cap shields and lead wires, leaving said rotor and bearing caps uncoated within said motor unit, said epoxy resin coating being fluidized substance when applied and a hard substance after being cured at room temperature.

References Cited in the file of this patent

UNITED STATES PATENTS

| | | |
|---|---|---|
| 2,286,993 | Naul | June 16, 1942 |
| 2,766,695 | Gailloud | Oct. 16, 1956 |
| 2,782,720 | Dochterman | Feb. 26, 1957 |
| 2,920,574 | Sampietro | Jan. 12, 1960 |
| 2,978,659 | Wahlgren | Apr. 4, 1961 |
| 2,997,776 | Matter et al. | Aug. 29, 1961 |
| 3,028,251 | Nagel | Apr. 3, 1962 |

FOREIGN PATENTS

| | | |
|---|---|---|
| 1,098,820 | Germany | Feb. 2, 1961 |